April 7, 1942.   E. F. FLORMAN   2,278,514
CHRONOGRAPHIC METHOD AND APPARATUS
Filed Nov. 22, 1939
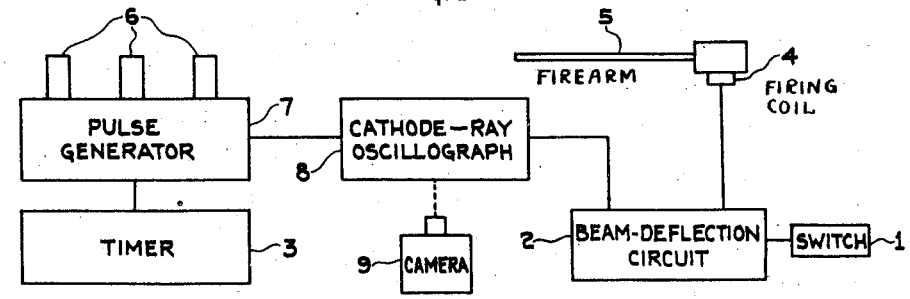
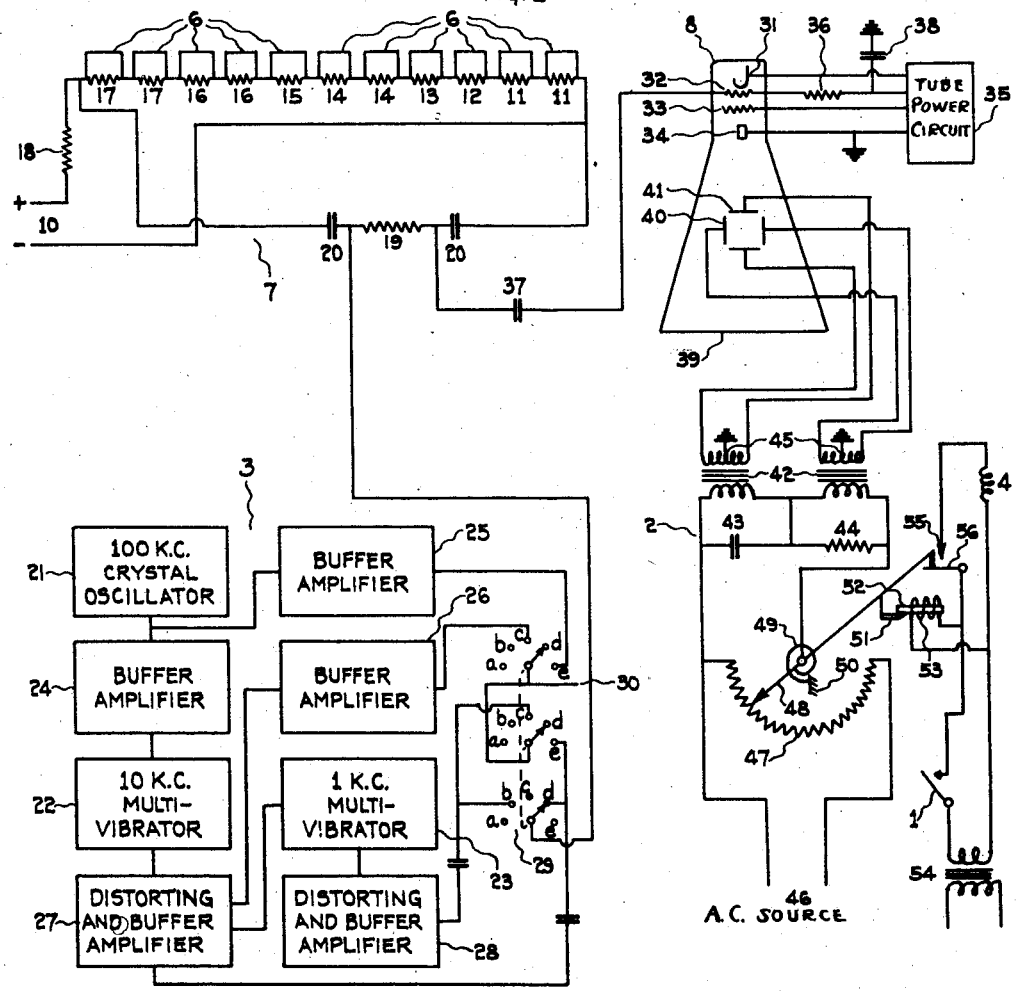
INVENTOR
EDWIN F. FLORMAN
BY *Joseph Fleischer*
ATTORNEY Patented Apr. 7, 1942

2,278,514

UNITED STATES PATENT OFFICE 2,278,514

CHRONOGRAPHIC METHOD AND APPARATUS

Edwin F. Florman, Godfrey Township, Madison County, Ill., assignor to Western Cartridge Company, East Alton, Ill., a corporation of Delaware Application November 22, 1939, Serial No. 305,629

9 Claims. (Cl. 234—36.5)

This invention relates to the measurement of time intervals and provides a method and apparatus whereby an accurate record of the duration of time intervals may be obtained. More particularly, a novel chronograph is provided, by means of which a compact record furnishing accurate readings of each of a series of consecutive time intervals may readily be secured even when the latter are of exceedingly short duration, as in the case of the times involved in the passage of a small arms projectile over relatively short successive portions of its trajectory.

Much effort has been expended in the past in the development of chronographs for use in measuring successive time intervals which are very short, as for the measurement of projectile velocities over successive portions of the trajectory, and various types of equipment have been described for this purpose. However, each of these types is lacking in some desired quality such as the reliability of the measured values, the ease of obtaining measurements, or the flexibility of the apparatus.

An object of this invention is to provide an improved method and apparatus by means of which a record which accurately indicates the duration of time intervals may be readily obtained.

Another object is the provision of a method and apparatus of this type which furnishes a compact record which is inherently timed, i. e. requires no supplemental timing curve.

A further object is to provide a cathode-ray oscillograph apparatus by means of which an inherently timed record may be obtained which accurately indicates the duration of each of a series of successive time intervals.

Another object is to provide a cathode-ray oscillograph apparatus by means of which an inherently timed record may be obtained showing the time of flight of a projectile over successive portions of its trajectory.

Other objects will appear from the following description.

In the accompanying drawing forming part of this specification,

Fig. 1 is a general diagrammatic view of apparatus for recording and measuring the time of flight of projectiles over short successive portions of the trajectory.

Fig. 2 is a more detailed diagrammatic view of such apparatus.

In accordance with the method and apparatus of this invention, generally stated, a cathode-ray oscillograph is provided and so operated that its electron beam produces a trace on the fluorescent screen which in inherently timed; an external electrical circuit is supplied which is arranged to cause a brief interruption or deflection of the cathode-ray beam at the beginning and end of each time interval being measured; and the desired record is obtained by photographing the trace produced on the fluorescent screen of the cathode-ray tube.

In order to produce the desired record in accordance with this invention, auxiliary circuits are utilized in conjunction with a cathode-ray oscillograph as follows: a timer circuit for producing an inherently timed record, a circuit for supplying proper voltage to the deflection plates of the cathode-ray tube so that the record traced on the screen will have the desired form, and a pulse generating circuit for briefly interrupting or deflecting the electron beam.

The timer circuit consists of any suitable arrangement capable of producing a cyclical change in the intensity of the cathode-ray beam. It may, for example, consist of a 100,000 cycle per second quartz crystal oscillator which is connected through an amplifier to and controls the frequency of a 10,000 cycle per second multivibrator. The latter produces an output voltage which is unsymmetrical; this output is fed through an amplifier to the grid of the cathode-ray tube and turns the electron beam on and off at a frequency of 10,000 cycles per second, the beam being on 80% of the time. The multivibrator output may also be fed to a multivibrator of lower frequency such as one having a frequency of 1,000 cycles per second, the output of which may be utilized to vary the intensity of the cathode-ray beam at this frequency. Similarly, other multivibrators of lower frequency may be attached and used, being in each case locked in step with the standard quartz oscillator. The relative frequencies can be checked against one another and in comparison with the standard quartz crystal oscillator frequency by feeding two superposed frequencies to the vertical deflecting plates of the cathode-ray tube, applying the proper "sweep" voltage to the horizontal deflecting plates and observing the resulting trace on the screen.

The beam deflection circuit is one having the property of producing a desired compact trace of the cathode-ray beam on the screen which will be convenient for measurement while embracing the total time period involved. Particularly when the total time interval over which measurements are desired is comparatively large, the beam deflection circuit is preferably one which causes the electron beam to trace a substantially spiral curve on the screen. This curve, through the added action of the timer circuit, is inherently timed, and may, for example, consist of a series of dashes each of which corresponds to a definite and known time interval.

The pulse generating circuit is one adapted to develop very rapidly a transitory voltage pulse, by virtue of a sudden change in impedance, at the boundary points, i. e. the beginning and end, of each of the time intervals to be measured. The voltage pulse is caused to act on the cathode-ray tube circuit to deflect or preferably extinguish the beam briefly so that interruptions are produced on the trace delineated on the fluorescent screen of the tube which correspond to the time instants it is desired to record. The duration of the interruptions may be adjusted so as to be readily noted on the record; a duration corresponding to three of the timed dashes, for example, has been found convenient in projectile velocity measurements.

The invention will perhaps best be understood from the following description of a preferred embodiment, reference being had to the figures of the drawing constituting a part of this specification. The specific apparatus, circuits, and mode of operation to be described, which are to be taken as illustrative of and not limiting the invention, refer to measurements of projectile velocities over short successive portions of their trajectory.

Referring to Fig. 1, which represents in block diagrammatic form an arrangement of apparatus suitable for recording and measuring projectile velocities, the operation is carried out as follows: after the cathode-ray beam is turned on, switch 1 is closed whereupon the beam deflection circuit 2 causes the beam to delineate a compact trace, such as a spiral curve, on the tube screen. This trace is inherently timed through the operation of the timer circuit 3, and may consist of a series of dashes, each representing a known period of time. At the proper instant with reference to the point of travel of the trace of the cathode-ray beam, a secondary switch is automatically closed in the beam deflection device, actuating the firing coil 4 and thus causing the firing of a round of ammunition in firearm 5. The projectile in its flight successively breaks a series of wire grids 6, spaced known distances apart along the trajectory. The breaking of each of the wire grids 6 causes an interruption or deflection of the timed trace through the agency of the pulse generating circuit 7. The trace produced on the tube screen of the cathode-ray tube is recorded on photographic film in camera 9 which is focused on the fluorescent screen. On development of the film, a permanent record is obtained from which the time of flight of the projectile between successive wire grids 6 may be read. It will be understood that any desired number of such grids may be employed at any convenient spacing along the trajectory. Furthermore, the apparatus may be arranged for measuring and recording any series of short time intervals.

An arrangement of elements which has been found to be well suited for obtaining an oscillograph record which furnishes the desired time measurements is represented diagrammatically in Fig. 2. In pulse generator circuit 7, a direct current voltage of 400 to 600 volts is applied across the leads at 10, it being understood that higher or lower voltages may be used depending on the magnitude of the pulse desired and the number of wire grids employed. Resistances 11 to 18 inclusive, are attached in series across this voltage, having resistances of 200, 225, 250, 300, 350, 400, 500, and 2500 ohms, respectively. Wire grids 6, of which eleven are illustrated, are shunted across the individual resistances as shown in the diagram. In parallel with the grid circuit, there is attached a circuit composed of a 20,000 ohm resistance 19 between two 0.04 microfarad condensers 20. In operation, when a grid is broken, the current through the 2500 ohm resistor 18 decreases and the voltage across the series condenser-resistor circuit suddenly increases, this voltage increase appearing across the 20,000 ohm resistor 19 as a pulse which attains its maximum value within a few micro-seconds and then gradually decreases. The circuit is connected with the cathode-ray tube so that the voltage pulse acts on the tube grid in the proper polarity to extinguish the cathode-ray beam for an exceedingly brief time period, thus producing an interruption in the trace described by the beam on the fluorescent screen. With a circuit as shown in the diagram and using a 600 volt potential drop at 10, the breakage of each grid in turn produces a voltage pulse having a maximum value of about 25 volts.

Timer circuit 3 consists of elements suitably arranged to provide an output alternating voltage of constant and known frequency so that when the same is impressed on the cathode-ray tube grid, the intensity of the electron beam is cyclically varied at the known frequency and the resulting trace on the screen inherently furnishes its own time calibration. A suitable circuit having this property and arranged to provide a trace consisting of a succession of timed dashes, is illustrated in the drawing and consists of a 100 kilocycle per second quartz crystal oscillator 21, a 10 kilocycle per second multivibrator 22, and a 1,000 cycle per second multivibrator 23, connected as shown through the interposed buffer amplifiers 24, 25, and 26 and distorting and buffer amplifiers 27 and 28, these amplifiers being of usual construction known to those skilled in the art of electronics. A three-deck switch 29, each deck having five contact positions, is provided for connecting the elements for convenient operation. Buffer amplifiers 24, 25, and 26 are provided to furnish desired isolation of the elements to which they are respectively connected. Amplifiers 27 and 28 function both as buffer and distorting amplifiers so as to produce an output voltage wave which is substantially rectangular. Thus, the output of amplifier 25 consists of a 100 kilocycle timing wave. Similarly, the outputs of amplifiers 26 and 28 consist respectively of 10 kilocycle and 1 kilocycle rectangular timing waves. By controlling the setting of switch 29, either the 10 or the 1 kilocycle rectangular wave may be impressed, through the pulse generator circuit 7, on the grid of the cathode-ray tube, resulting in a trace on the screen containing respectively 10,000 dashes per second for the *d* position or 1,000 dashes per second for the *b* position. If desired, the two timing voltages may be impressed on the grid simultaneously, resulting in a compositely timed trace. The circuit components are such that multivibrators 22 and 23 are locked in step with each other and with the crystal oscillator 21.

The frequencies may be checked against one another whenever desired by feeding two superposed voltages, either the 100 and the 10 kilocycle waves or the 10 and the 1 kilocycle by setting switch 29 at the e or c position respectively, through lead 30 directly to the vertical deflecting plates of the cathode-ray tube while at the same time applying a suitable "sweep" voltage to the horizontal deflecting plates. When the circuits are functioning properly, the resulting trace on the fluorescent screen consists of a wavy line containing ten small undulations per cycle.

The cathode-ray oscillograph 8 is connected as shown, the tube elements consisting of the cathode 31, grid 32, first anode 33, and second anode 34 being connected to a conventional cathode-ray tube power circuit 35 which is provided with the necessary switching and regulating facilities. Condensers 37 and 38 are respectively of 0.075 and 2.0 microfarad capacity, while resistor 36 has a resistance of 150,000 ohms. The connections are such that the superposed voltages from the timer circuit 3 and pulse generating circuit 7 appear across resistor 36 and control the A. C. voltage of the cathode-ray tube grid 32, and thus control the intensity of the cathode-ray beam which acts on the fluorescent screen 39.

The beam deflection circuit 2, illustrated in the drawing, is of a type leading to the delineation of a compact trace, for example a spiral curve, on screen 39. The two pairs of the cathode-ray tube deflecting plates 40 and 41 are connected respectively to the secondary coils of transformers 42, upon the primary coils of which, 60 cycle alternating voltages are impressed which differ 90 degrees in time phase. This difference in time phase may conveniently be produced by means of the elemental circuit shown in Fig. 2 in which a single-phase voltage is impressed at leads 46 across the series circuit consisting of condenser 43 and resistor 44, the values of which are so chosen that the voltages across these elements are equal in magnitude but, because of the nature of the condenser reactance, differ in time phase by 90 degrees. Representative values for the condenser 43 and the resistor 44 are 0.1 microfarad and 32,500 ohms, respectively for an impressed voltage of 60 cycles per second. Transformers 42, which as known in the art may conveniently be of the audio-frequency type, are connected, as shown in Fig. 2, across the two-phase circuit set up by condenser 43 and resistor 44, the secondary coils being grounded at their center-points 45. When a 60 cycle A. C. voltage of 110 volts is impressed across leads 46, alternating voltages which are identical excepting for a ninety degree difference in time phase appear in the transformer coils 42. The result of impressing alternating voltages of the same amplitude and frequency but differing ninety degrees in time phase on the deflecting plates 40 and 41 is that a circular trace of the cathode-ray beam is delineated on screen 39.

In order to transform the circular trace to a spiral, a spring-operated potentiometer is provided consisting of resistance 47 and rotating contact arm 48, actuated by spring 49, one end of which is fastened to the arm 48 and the other to support 50. A catch 51 is attached to arm 48 and is engaged by a movable iron core 52 inside coil 53.

In making a measurement, firearm 5 is loaded with the ammunition under test, wire grids 6 are connected, and flow of current is started through the pulse generator circuit 7 by closing a suitable switch, not shown in the drawing. Contact arm 48 is placed in position so that spring 49 is wound up and catch 51 is engaged by member 52. The cathode-ray beam is turned on and delineates a circular trace on the fluorescent screen 39. Camera 9 is loaded with film, focused on screen 39, and the shutter is opened.

With all elements thus placed in readiness, switch 1 is closed, whereupon a current derived from the secondary coil of transformer 54, the primary coil of which is supplied with 110 volt A. C., is caused to flow through coil 53 and actuates core 52 so that catch 51 is released and with it rotating arm 48. Movement of the latter along resistance 47 causes a progressive change in the voltage impressed on the deflecting plates 40 and 41, with the result that the trace of the cathode-ray beam becomes a spiral curve which is inherently timed by virtue of the cyclical change in intensity brought about by the timer circuit 3, the spiral curve consisting in this example of a succession of timed dashes. With the use of a nine inch cathode-ray tube and 60 cycle voltage, a spiral curve of about twenty-five turns can be obtained on the screen, corresponding to a total time interval of about 0.40 second, in the record of which the dashes can be readily counted.

Additional flexibility in operation may be obtained by providing a range of values for the rate of revolution of the spiral curve. This can readily be secured, for example, by substituting a frequency-adjustable audio oscillator for the 60 cycle alternating voltage as the A. C. source 46 to operate the deflection plate voltage control circuit and making the appropriate changes, which will be obvious to those skilled in the art, in the rate of rotation of the spring-operated potentiometer and in the values of the other elements of the circuit when a voltage frequency other than 60 cycle is used.

After a sufficient distance of travel of rotating arm 48 to yield a clear starting point of the timed spiral trace of the cathode-ray beam, the circuit through adjustable contact 55 is closed through the release of switch blade 56, actuated by a spring not shown in the drawing, on continued movement of sliding arm 48. Thereupon, current flows from the secondary of transformer 54 through firing coil 4 and the firing mechanism of firearm 5 is thereby actuated at the desired instant. The emitted projectile breaks the wire grids 6 in succession, each break being recorded as an interruption or deflection of the spiral timed trace of the cathode-ray beam. After development of the film, the time of passage of the projectile from grid to grid can be readily evaluated by counting the dashes between the points of interruption.

The following table contains typical measurements on 22 caliber ammunition, the numbers representing the average measured velocities over successive ten yard intervals.

| Long rifle | Swift |
| --- | --- |
| Ft./sec. | Ft./sec. |
| 1,305 | 4,052 |
| 1,263 | 3,908 |
| 1,226 | 3,783 |
| 1,192 | 3,668 |
| 1,160 | 3,560 |
| 1,133 | 3,454 |
| 1,108 | 3,352 |
| 1,090 | 3,253 |
| 1,077 | 3,156 |

The above values are closely reproducible in successive measurements made with similarly loaded cartridges and their accuracy is of such high order that the effect of even slight modifications in the ammunition, as in the weight distribution or shape of the projectile, may be readily detected. The method and apparatus of this invention are accordingly well adapted for use in perfecting ammunition by enabling the detection of the factors which adversely affect the ballistic behavior.

It will be understood that the principles of this invention are generally applicable to the measurement of time intervals, even of very brief duration, and in particular to the obtainment of accurate records of successive time intervals. Accordingly, the invention is to be understood as not limited to the specific elements and details described herein but to include modifications within the spirit of the invention which may be realized by those skilled in the art from study of the above description, such changes being contemplated as within the scope of the appended claims.

Having now described the invention, what is claimed as new and is desired to be secured by Letters Patent, is:

1. Chronographic apparatus comprising the combination with a cathode-ray tube, having a grid, cathode-ray beam deflection plates, and a fluorescent screen, of a grid voltage control circuit for the said tube having a voltage output varying at known constant frequency, a deflection plate control circuit adapted to form a single-scan compact trace of the cathode-ray beam on the said screen, and an external circuit adapted to produce brief interruptions of the said beam.

2. The combination with a cathode-ray tube of a grid voltage control circuit for the said tube having a voltage output varying at known constant frequency, a deflection-plate control circuit adapted to form a single-scan substantially spiral trace of the cathode-ray beam, and means for interrupting the said beam coincidentally with the boundaries of a series of unknown time intervals.

3. The combination with a cathode-ray tube of a grid voltage control circuit for the said tube having a voltage output varying at known constant frequency, and auxiliary grid control means consisting of a circuit adapted to develop a transitory voltage pulse for briefly interrupting the cathode-ray beam.

4. The combination with a cathode-ray tube, having a beam-control grid and beam deflection plates, of a grid voltage control circuit having a voltage output varying at known constant frequency, auxiliary grid control means adapted to develop a transitory voltage pulse, and a pair of beam deflection-plate control circuits having voltage outputs of substantially the same amplitude and frequency but differing substantially ninety degrees in time phase.

5. The combination with a cathode-ray tube, having a beam-control grid and beam deflection plates, of a grid voltage control circuit having a voltage output varying at known constant frequency, a pair of beam deflection-plate control circuits having voltage outputs of substantially identical amplitude and frequency but differing substantially ninety degrees in time phase, and means for progressively varying the amplitude of the output voltage of the said deflection-plate control circuits.

6. Chronographic apparatus comprising the combination with a cathode-ray tube having a beam-control grid and beam deflection plates, of means for varying the intensity of the cathode-ray beam thereof at a known constant frequency, a grid voltage control circuit adapted to produce brief interruptions of the said beam, and a beam deflection-plate control circuit adapted to form a single-scan substantially spiral trace of the said beam.

7. Chronographic apparatus comprising the combination with a cathode-ray tube having a fluorescent screen, of grid control means for varying the intensity of the cathode-ray beam at known constant frequency, beam deflection means for delineating a single-scan compact trace of the said beam on the said screen, and means for impressing a transitory voltage pulse on the said grid control means at the beginning and end of a time interval under measurement.

8. Chronographic apparatus comprising the combination of means for generating a beam of cathode rays, means for varying the intensity of the said beam at a known constant frequency, means for deflecting the beam to describe a single-scan compact trace thereof, and means for interrupting the said beam at the beginning and the end of a time interval under measurement.

9. Chronographic apparatus comprising the combination of means for generating a beam of cathode rays, means for varying the intensity of the said beam at a known constant frequency, means for deflecting the beam to describe a single-scan substantially spiral trace thereof, and means for interrupting the said beam at the beginning and end of a time interval under measurement.

EDWIN F. FLORMAN.